US009499872B2

(12) United States Patent
Santén et al.

(10) Patent No.: US 9,499,872 B2
(45) Date of Patent: Nov. 22, 2016

(54) IRON REDUCTION PROCESS AND EQUIPMENT

(71) Applicant: Val'Eas Recycling Solutions AB, Hofors (SE)

(72) Inventors: Sven Santén, Hofors (SE); Matej Imris, Gävle (SE)

(73) Assignee: VAL'EAS RECYCLING SOLUTIONS AB, Hofors (SE)

( * ) Notice: Subject to any disclaimer, the term of this patent is extended or adjusted under 35 U.S.C. 154(b) by 188 days.

(21) Appl. No.: 14/383,471

(22) PCT Filed: Feb. 7, 2013

(86) PCT No.: PCT/SE2013/050103
§ 371 (c)(1),
(2) Date: Sep. 5, 2014

(87) PCT Pub. No.: WO2013/133748
PCT Pub. Date: Sep. 12, 2013

(65) Prior Publication Data
US 2015/0040722 A1    Feb. 12, 2015

(30) Foreign Application Priority Data

Mar. 8, 2012    (SE) ...................... 1250215

(51) Int. Cl.
*C21B 11/10*    (2006.01)
*C21B 13/14*    (2006.01)
(Continued)

(52) U.S. Cl.
CPC ................ *C21B 11/10* (2013.01); *C21B 3/00* (2013.01); *C21B 3/06* (2013.01); *C21B 13/0006* (2013.01);
(Continued)

(58) Field of Classification Search
CPC ...................... C21B 11/10; C21B 3/06; C21B 13/0006; C21B 13/0026; C21B
(Continued)

(56) References Cited

U.S. PATENT DOCUMENTS 4,488,905 A   12/1984 Santen
4,601,752 A    7/1986 Santen et al.
(Continued)

FOREIGN PATENT DOCUMENTS

DE   2413558 A1   10/1974
EP   0037809 A1   10/1981
(Continued)

OTHER PUBLICATIONS

Orring A., Nu blir masugnen overflodig i Hofors—Ny Teknik, Feb. 6, 2013, retrieved from: www.nyteknik.se/nyheter/automation/verkstadsautomation/article 3631401.ece.
(Continued)

*Primary Examiner* — George Wyszomierski
*Assistant Examiner* — Tima M McGuthry Banks
(74) *Attorney, Agent, or Firm* — Birch, Stewart, Kolasch & Birch, LLP

(57) ABSTRACT

Iron production furnace equipment includes a melting reactor into which iron oxide-containing raw material and slag formers are added. A melter arrangement melts the iron oxide-containing raw material and transforms the melted raw material into liquid slag. A smelting reduction reactor is connected to the melting reactor by a slag transfer arrangement. The smelting reduction reactor includes a heater arrangement for heating the slag, a port for supplying a reductant for reducing the iron oxide in the slag into a liquid iron melt and produces a combustible gas mixture including at least one of CO and $H_2$. A gas connection is provided between the smelting reduction reactor and the melter
(Continued)

arrangement. The melter arrangement in turn comprises a combuster combusting the gas mixture for purpose of melting the raw material.

22 Claims, 2 Drawing Sheets

(51) Int. Cl.

| | | |
|---|---|---|
| *C21B 13/00* | (2006.01) | |
| *C21C 7/00* | (2006.01) | |
| *F27B 1/04* | (2006.01) | |
| *F27B 1/08* | (2006.01) | |
| *F27D 11/08* | (2006.01) | |
| *C21B 3/00* | (2006.01) | |
| *C21B 3/06* | (2006.01) | |
| *F27D 99/00* | (2010.01) | |

(52) U.S. Cl.
CPC ......... *C21B 13/0026* (2013.01); *C21B 13/143* (2013.01); *C21C 7/00* (2013.01); *F27B 1/04* (2013.01); *F27B 1/08* (2013.01); *F27D 11/08* (2013.01); *F27D 2099/0031* (2013.01); *Y02P 10/136* (2015.11); *Y02W 30/543* (2015.05)

(58) Field of Classification Search
CPC ................. 13/143;C21B 2100/04; C21C 7/00; F27B 1/04; F27B 1/08; F27D 11/08; C22B 7/04

See application file for complete search history.

(56) References Cited

U.S. PATENT DOCUMENTS

| | | | | |
|---|---|---|---|---|
| 4,617,671 | A | 10/1986 | Lugscheider et al. | |
| 2001/0046251 | A1* | 11/2001 | Vallomy | C21B 3/06 373/9 |
| 2009/0211398 | A1* | 8/2009 | Kunze | C22B 7/04 75/10.35 |
| 2011/0011211 | A1* | 1/2011 | Orth | C21B 7/002 75/392 |
| 2011/0113925 | A1* | 5/2011 | Perry | B22F 9/08 75/363 |

FOREIGN PATENT DOCUMENTS

| | | | |
|---|---|---|---|
| FR | 2848123 | A1 | 6/2004 |
| SE | 453304 | B | 1/1988 |
| WO | WO 97/17473 | A1 | 5/1997 |
| WO | WO 00/20648 | A1 | 4/2000 |

OTHER PUBLICATIONS

Usachev et al., Modern processes for the coke-less production of iron, Metallurgist, vol. 46, Nos. 03-04, 2002, pp. 117-130.
Extended European Search Report dated Nov. 30, 2015, for European Application No. 13758219.3.

* cited by examiner

IRON REDUCTION PROCESS AND EQUIPMENT

TECHNICAL FIELD

The present invention relates in general to production of molten iron from iron oxide bearing ores and residues.

BACKGROUND

Approximately 1.6 billion tons of steel is produced annually, out of which 1 billion tons is hot iron metal produced from iron ore in the blast furnace production route. The hot iron metal production accounts for 8% of the world's $CO_2$ emissions. Any contribution that will reduce the $CO_2$ emissions will therefore have an enormous impact on the environment.

The major part of all iron produced from iron ore is produced in the blast furnace process. That process has been gradually developed and refined over a time span of at least 300 years and has now reached very close to its theoretical optimum. In spite of this, the process suffers from a number of serious drawbacks. As mentioned above, the $CO_2$ emission is high and the energy efficiency is low, only about 50%. The blast furnace iron production chain also represents an enormous investment with its pelletizing plant, coking plant and blast furnaces with hot stoves and oxygen plants. Therefore, there have been a great number of attempts over the past 75 years to develop alternative processes to overcome these drawbacks and replace the blast furnace. The search for a new more energy-efficient and/or cheaper process has been along one of three routes. The first is solid state reduction processes, such as the "Direct Reduced Iron" process. The second is a combination of pre-reduction in solid state followed by a final smelting process. The third one is a further increase of the energy utilization in the blast furnace process by re-circulation of the partly utilized off-gas after $CO_2$ stripping.

The development along these three routes all utilize the counter-current principles to obtain as high utilization of the energy as possible, but are limited by the equilibriums between the different iron oxides and the reduction gas. All these processes use coal both as reducing agent and energy supply. This means that none of these new iron making processes represent any major breakthrough when it comes to $CO_2$ emissions.

Today most of the alternative processes to the blast furnace process are based on a process that is based on combinations of pre-reduction in solid state followed by a final smelting step. In this type of processes the gas leaving the smelting step is utilized in the pre-reduction step.

Only one of these processes, the Corex process, has reached a commercial operation. An overview can be found in e.g. "Modern processes for the coke-less production of iron" by A. B. Usachev et al., in *Metallurgist*, Vol. 46, Nos. 03-04, 2002, pp. 117-130. The Corex process consists of two reduction stages. In the first stage, the iron oxide is partly reduced and then followed by a smelting reduction stage to produce a molten metal similar in composition to a blast furnace pig iron. Corex's disadvantage is the need for agglomerated ore, and since coal is used both as fuel and as reducing agent, the volume of off-gases is high, making the downstream off-gas system expensive. This increases not only operating and investment costs but also the $CO_2$ footprint.

Finex, CCF, DIOS and Hismelt are processes that use similar approach as COREX, that is pre-reduction in solid phase and final reduction in a liquid phase. The major difference between these processes and Corex is the type of raw material used. While COREX uses sinter, pellets or lump, these four other processes use fine ore as raw material, which after pre-reduction is transferred to a second, smelting reduction stage producing a liquid metal. Finex and CCF are in experimental phase while DIOS and Hismelt are in demonstration plant phase. All of these processes including Corex operate at high pressures in the liquid-phase reduction step and need to be hermetically sealed. Since the coal is used both as fuel and as a reducing agent, there are similar disadvantages as for the Corex process.

Another attempt for a more substantial decrease in $CO_2$, emission is described in Swedish patent SE 453304 where the preheating, pre-reduction and melting reduction is carried out by partial combustion of the off-gases from the final smelting reduction, all these reactions taking place in the same reactor. The weakness of this process is the unavoidable inter mixing between both gases and liquids from the different zones in the reactor which makes it impossible to balance the generation of CO-gas in the final smelting reduction stage with the need for CO-gas in the other stages. Furthermore the partial combustion of the CO-gas in the preheating—pre-reduction stage makes it unsuitable to inject the gas into the smelting reduction stage as plasma gas.

Even though efforts have been made making the reduction of oxides of iron more energy efficient, e.g. by pre-reduction of the incoming oxide raw material, the amount of $CO_2$ released from the process is still very high. A general problem with prior art methods for reducing iron is that they are inefficient in using the supplied energy and produce large amounts of carbon dioxide emissions, which make the processes environmentally unfriendly and expensive.

SUMMARY

A general object of the present invention is to enable manufacturing of iron in a more energy efficient manner and causing less emission of gases, especially $CO_2$.

The above object is achieved by methods and arrangements according to the enclosed independent patent claims. Preferred embodiments are presented in the dependent claims. In general words, in a first aspect, a method for manufacturing of iron has a melting stage and a smelting reduction stage. The melting stage comprises introduction of iron oxide-containing raw material and slag formers to a melting reactor. The iron oxide-containing raw material is melted in the melting reactor. The melted iron oxide-containing raw material is transformed into a liquid slag. The liquid slag is transferred into a smelting reduction reactor. The liquid slag is heated in the smelting reduction reactor. A reducing agent is supplied to the smelting reduction reactor. The heating and reducing agent supply gives a reduction of the liquid slag into a liquid iron melt in the smelting reduction reactor and produces also a combustible gas mixture comprising at least one of CO and $H_2$. The melting in the melting stage comprises in turn combustion of at least a part of at least one of CO and $H_2$ in the combustible gas mixture in or in connection with the melting reactor, for utilizing generated combustion heat for the melting.

In preferred embodiments the heating in the smelting reduction stage and the melting in the melting stage comprises submerged injection of hot gases from plasma generators.

In a second aspect, a furnace equipment for manufacturing of iron has a melting reactor and a smelting reduction reactor, connected by a slag transfer arrangement to the smelting reduction reactor. The melting reactor comprises means for introducing an iron oxide-containing raw material and slag formers to the melting reactor. A melter arrangement is configured to melt the iron oxide-containing raw material in the melting reactor and to transform the melted iron oxide-containing raw material into a liquid slag. The smelting reduction reactor comprises a heater arrangement configured to heat the liquid slag. The smelting reducing reactor further comprises means for supplying a reducing agent into the liquid slag for reducing the FeO content of the liquid slag into a liquid iron melt and for producing a combustible gas mixture comprising at least one of CO and $H_2$. A gas connection is connected between an upper part of the smelting reduction reactor and the melter arrangement in the melting reactor for supplying the combustible gas mixture to the melter arrangement. The melter arrangement comprises a combuster that is configured to cause combustion of at least a part of at least one of CO and $H_2$ in the combustible gas mixture in or in connection with the melting reactor. The melter arrangement is thus configured for allowing utilization of generated combustion heat for the melting.

In preferred embodiments, a plasma generator is provided in each reactor for submerged injection of hot gases.

One advantage with the present invention is that the reduction of iron can be performed in an energy-efficient manner and in a way that reduces the total emission of oxides of carbon. Further advantages are discussed more in detail in connection with the description of the different embodiments below.

BRIEF DESCRIPTION OF THE DRAWINGS

The invention, together with further objects and advantages thereof, may best be understood by making reference to the following description taken together with the accompanying drawings, in which.

DETAILED DESCRIPTION

Figure 1:
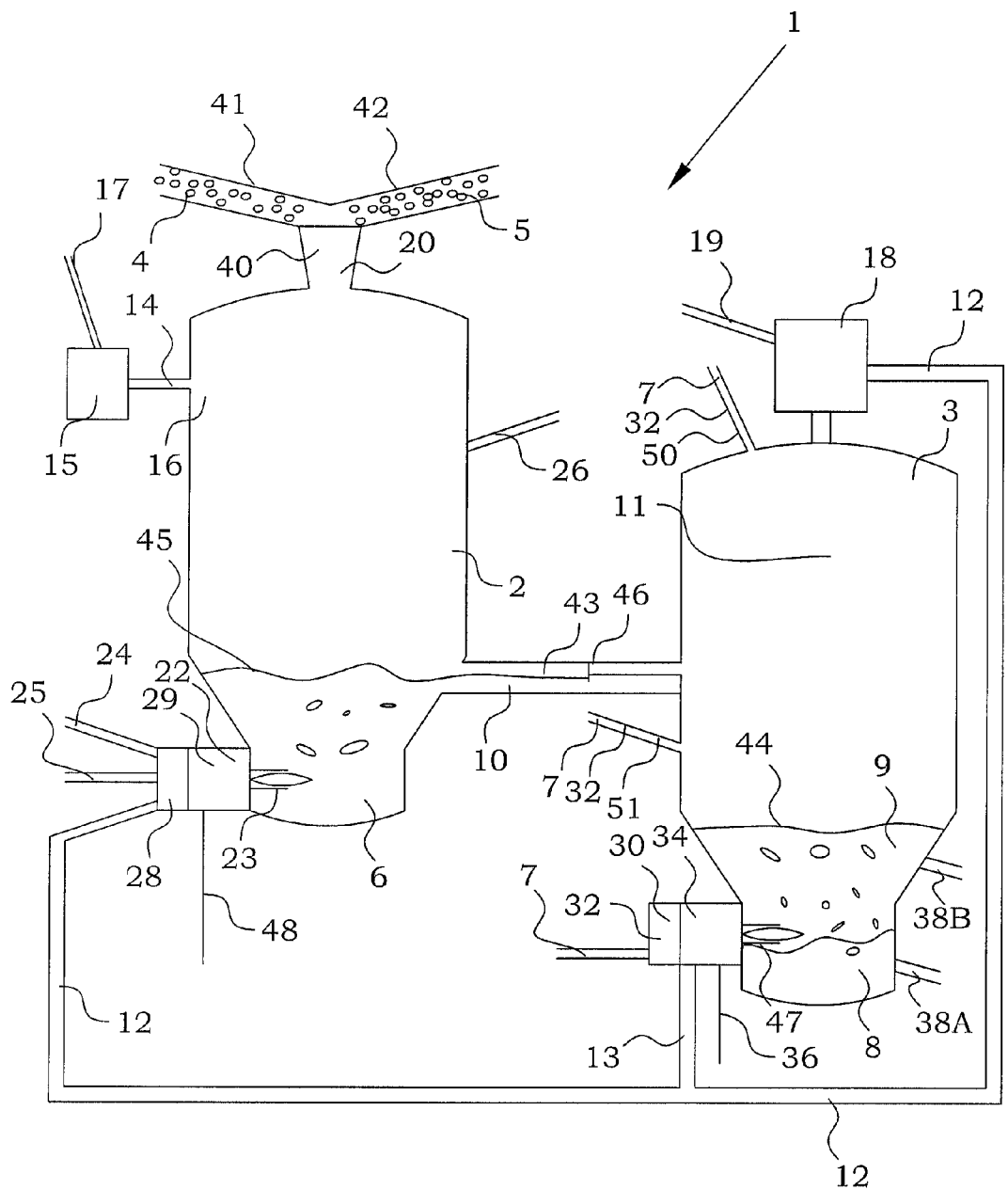
FIG. 1 is a schematic illustration of an embodiment of a furnace equipment according to the present invention.

Throughout the drawings, the same reference numbers are used for similar or corresponding elements.

In many prior art iron reduction arrangements, the need for melting the raw material requires large amounts of energy. This energy is typically provided to the smelting reduction reactor as reaction heat when burning carbon-containing substances. However, due to the equilibrium requirement in the iron-forming smelting reduction stage, such combustion can not be complete and large amounts of CO are produced. Since the heat generated by burning carbon-containing substances into CO is much lower than the heat generated by burning the same carbon-containing substances into $CO_2$, the utilization of the fuel is not very efficient.

One part aspect of the present invention is therefore to separate the act of melting the raw material from the actual final reduction, which is determined by the equilibrium conditions. In such a way, the energy content in the fuel can be utilized almost completely.

Furthermore, since the ratio of $CO/CO_2$ in the smelting reduction phase cannot be reduced without causing an incomplete reduction of iron, there will anyway be non-negligible amounts of CO produced at the reduction step. However, since the melting act is separated from the physical position where the reduction conditions are valid, this reduction gas mixture can instead be fed to the melting stage, where the remaining thermal and/or chemical energy content can be utilized.

By selecting suitable reduction levels and temperatures in the melted slag produced by the melting action and bringing the melted slag into the smelting reduction process chamber, the need for reductants (or equivalently reducing agents) and energy can be balanced in such a way that at least 80% of the energy content of the combustion gas produced in the smelting reduction stage can be utilized in the melting stage.

In a typical embodiment according to the present invention, a two stage smelting reduction process for the production of molten iron from iron oxide bearing raw materials is presented, where the energy-rich combustible off-gases from the final smelting reduction stage are used as a fuel in the first melting stage. By utilizing the heat of combustion of the combustible off-gas for melting of the ingoing iron oxide bearing material 80-100% of the complete energy content of the off-gas can typically be utilized. In this way the combustion energy of the off-gas can be "re-transferred" to the final smelting reduction stage as sensible heat in an iron oxide bearing molten slag.

Even since a considerable amount of energy in this way is supplied to the molten iron oxide bearing slag there will typically be a need for extra heat energy to cover the endothermic iron oxide reduction in the final smelting reduction stage. This heat energy is in this embodiment most efficiently supplied by submerged plasma generators, which bubble the very hot plasma gases through the slag bath. The reason to use plasma generators in preferred embodiments to supply heat energy to the smelting reduction stage is that the electrical energy can be transferred to the melt at an efficiency of 80% while the alternative is combustion of carbon with oxygen to carbon monoxide which gives an efficiency of maximum 20%. When utilizing the off-gas from the smelting reduction stage, which typically contain mainly carbon monoxide or in certain cases hydrogen, as a fuel in the first melting stage, the energy content of the fuel gas generated from the reduction of FeO to Fe is in the same range or in slight excess to the heat energy needed for melting the ingoing iron oxide bearing material plus slag formers in the melting stage. The energy content of the fuel gas can in particular embodiment to some extend be controlled by adding hydrocarbons to the smelting reduction stage resulting in some additional hydrogen in the fuel gas.

By combining the utilization of the combustible off-gas from the smelting reduction stage as a fuel to melt the ingoing materials in the melting stage with the most efficient way to transfer heat energy to the molten slag in the smelting reduction stage the invented process consumes less energy and gives at least 50% reduction of $CO_2$-emission compared to existing iron making processes.

FIG. 1 illustrates in a schematic manner an embodiment of a furnace equipment 1 for manufacturing of iron according to the present invention. A melting reactor 2 comprises means 20 for introducing or adding material to the melting reactor. The material added by such a means 20 for introducing is an iron-containing raw material, typically an iron oxide-containing raw material 4, and slag formers 5. The iron oxide-containing raw material 4 may also comprise other substances as well, besides the iron oxide. This will be discussed further below. The means 20 for introducing, for adding material comprises typically an inlet 40 and transporters 41, 42 for the iron oxide-containing raw material 4 and the slag formers 5, respectively. However, many alternative configurations can also be applied. Such alternative configurations could provide the material continuously, quasi-continuously or intermittently, and the iron oxide-containing raw material 4 and the slag formers 5 could be introduced at least partially simultaneously or separated in time. Such parts are as such well know in prior art and have no direct impact on the basic technical effect of the present invention and will therefore not be discussed in much detail. In a preferred embodiment, however, the iron-containing raw material 4, e.g. ore, is fed to the upper part of the melting reactor 2.

The melting reactor 2, typically a melting shaft, further comprises a melter arrangement 22 configured to melt the iron oxide-containing raw material 4 in said melting reactor 2. The melted iron oxide-containing raw material 4 is transformed by the melter arrangement 22 into a liquid slag 6, typically a liquid slag 6 containing iron oxide. The melter arrangement 22 will be discussed more in detail further below.

The iron oxide containing liquid slag 6 may have different degrees of oxidation. Typically, when most of the iron oxide-containing raw material comprises iron ores with basically $Fe_2O_3$ or $Fe_3O_4$ content, the melting is associated with a certain degree of pre-reduction of the iron. Also when different kinds of iron-containing waste material, such as mill scale material, oxygen scarfing granulates, EAF dust, mill scale sludge material, sludge from water treatment, dust from blasting, grinding and scrap cutting etc. are used as raw material, a pre-reduction is typically present. However, if the raw material has a low degree of oxidation or if the oxidation level of the iron oxide containing liquid slag 6 is deliberately driven to relatively high oxidation degree, pre-reduction may be absent and even a slight oxidation may take place. In a typical case, however, the transforming of the iron oxide-containing raw material comprises a partial reduction of the iron oxide-containing raw material into an oxidation state of FeO (wüstite slag) or close thereto.

The iron oxide containing liquid slag 6 is provided to a smelting reduction reactor 3 by a slag transfer arrangement 10. The slag transfer arrangement 10 thereby connects the melting reactor 2 and the smelting reduction reactor 3. In a simplest embodiment, the slag transfer arrangement 10 comprises a slag transfer launder 43 connecting the smelting reactor 3 and the smelting reduction reactor 2. In a particular embodiment, the slag transfer launder may comprise a slag lock 46. The slag lock 46 is configured to prevent any mixing between the atmospheres in the melting reactor 2 and smelting reduction reactor 3, respectively. In alternative embodiments, the slag transfer arrangement 10 can be configured in other ways, e.g. as a tapping station where the slag is tapped into ladles and a smelting reduction reactor inlet into which the liquid slag is poured from the ladles.

The smelting reduction reactor 3, typically a slag reducer shaft, comprises a heater arrangement 30, which is configured to heat the iron oxide containing liquid slag in the smelting reduction reactor 3. The slag smelting reduction reactor 3 also comprises a reductant supplier or means 32 for supplying a reducing agent 7 into the smelting reduction reactor 3. Solid reductants or reducing agents, such as coal or petro coke can also be fed to the smelting reduction reactor 3 through an opening or feed port 50 in the roof of the smelting reduction reactor 3 and/or via lances through a feed port 51 in the reactor wall, preferably also in the upper part of the shaft.

The reductant or reducing agent 7 is aimed for reducing the iron oxide containing liquid slag entered into the smelting reduction reactor 3 into a liquid iron melt 8. At the same time a slag 9 is generated and a reduction combustible gas mixture 11 is produced. This combustible gas mixture 11 from the reduction comprises CO and/or $H_2$ and typically also low contents of $CO_2$ and $H_2O$. The liquid iron melt 8 and the slag 9 can be allowed to exit the smelting reduction reactor by outlets 38A and 38B, respectively. This can be performed according to conventional techniques.

In the present embodiment heat energy is supplied to the smelting reduction reactor 3 by a plasma generator 34 operating on electricity and cleaned compressed off-gas, i.e. cleaned combustible gas mixture 12, from the same reactor. This will be discussed more further below. The high temperature plasma jet produced in the plasma generator 34 is introduced into the smelting reduction reactor 3 via a water cooled tuyere 47 beneath surface 44 of the liquid slag 9 thereby forcing the hot gases to bubble through the slag bath. The reductant 7 and in certain situations oxygen and/or air are introduced into the tuyere 47 before the jet enters the slag bath.

In other words, the acts of heating the iron oxide-containing liquid slag in the smelting reduction reactor 3 and supplying of the reductant 7 are in the present embodiment performed jointly by operating of the plasma generator 34 into a tuyere 47, into which the reductant 7 can be provided. This is made in order to produce a plasma jet, and the plasma jet is introduced into the smelting reduction reactor 3 at a level below a surface 44 of the slag 9. The reductant 7 is in the present embodiment as well as in many other embodiments preferably selected as one or several of charcoal, coal, hydrogen, gaseous hydrocarbons, liquid hydrocarbons and coke. One advantage with using the plasma generator tuyere combination 34-47 for supplying heat and reductants 7 is that the amount of reductant can be adjusted to meet the reducing conditions in the reducer shaft, i.e. the smelting reduction reactor 3. If additional heat is needed, such heat can be supplied by electricity via an electric energy supply 36. In other words, the plasma generator 34 is configured to allow control of feed rate of reducing agent 7 and/or control of supplied amount of heat to the smelting reduction reactor 3.

In alternative embodiments, also other solutions for the heater arrangement 30 and the reductant supplier 32 can be utilized, where the heater arrangement 30 and the means 32 for supplying a reducing agent 7 are provided separately. The heater arrangement 30 may still preferably be constituted by a plasma generator 34.

The use of a plasma generator with a plasma jet introduced into the liquid phase gives additional advantage due to the high energy density of the plasma jet and the efficient gas and heat transfer when the hot plasma gases are caused to bubble through the slag.

In the reducer shaft 3, the reducing conditions are kept strong by controlling the feed rate of reductants 7. The plasma generators supply the main part of the necessary heat energy. The produced iron metal is collected as a liquid iron melt in the bottom part of the reducer shaft 3 and is tapped through the outlet 38A at intervals or continuously. Also the slag 9 is discharged in intervals or continuously but in the outlet 38B at a higher level. The slag 9 composition is preferably adjusted to relative high basicity, most preferably in the range of 1-1.5. More generally, the basicity is preferably adjusted in order to keep a melting temperature of the slag in a convenient range with respect to the melting temperature of molten iron with a carbon content of 1-4%. Preferably, in continuous operation the FeO content of the slag 9 in the reducer shaft 3 is controlled to be around the level of 2-6% to satisfy the FeO activity, the Fe yield and convenient melting temperatures.

In a preferred embodiment, the slag formers added in the melting reactor are added in a composition and amount adapted for achieving suitable properties of the liquid slag. In one embodiment, slag formers are selected to comprise at least one of limestone, dolomite and quartz. The amounts of added slag formers is selected to give the liquid slag a melting point within 50-150° C. above a melting point of the liquid iron melt. Such adaptation has to be made at least in dependence on the composition of the iron oxide-containing raw material and the amount of carbon in the final liquid iron melt.

Since the smelting reduction reactor 3 is preferably operated with a rather basic slag and at higher oxygen potential than e.g. a conventional blast furnace, phosphorous will tend to be incorporated in the slag. The produced iron metal has therefore typically a low phosphorous content irrespective of the raw material composition.

In the present embodiment, a gas connection 12 is connected between an upper part of the smelting reduction reactor 3 and the melter arrangement 22 in the melting reactor 2. The gas connection 12 is thereby configured for supplying at least a part of the combustible gas mixture 11 to the melter arrangement 22. The combustible gas mixture 11 passes in the present embodiment a gas treatment unit 18, in which the gas mixture 11 is cooled, cleaned and compressed. Any impurities 19 are preferably removed and handled separately. The cleaned gas mixture 12, comprising mainly CO and/or $H_2$, is in the present embodiment to a part supplied to the plasma generator 34 through a drive gas supply 13 as mentioned further above. The remaining part, which typically is the majority part, is provided to the melter arrangement 22.

The melter arrangement 22 in turn comprises a combuster 28. The combuster 28 is configured to combust CO and/or $H_2$ from the, preferably cleaned, combustible gas mixture 12 in or in connection with the melting reactor 2. The combuster 28 is configured for allowing a utilization of that generated combustion heat for the melting in the melting reactor 2.

In a particular embodiment, the melter arrangement 22 comprises a combination of a plasma generator 29 and a tuyere 23 in which the combustion takes place. This combination is configured to produce a hot gas jet. The melter arrangement 22 is further configured for introducing the hot gas jet into the melting reactor 2 at a level below a surface 45 of the melted iron oxide-containing raw material. A supply line 24 for additional plasma gas may also be provided. The melter arrangement 22 of this embodiment has certain additional advantages. The plasma generator 29 is easy to control concerning the amount of gas passing the plasma generator. In case there is additional heat required, such heat can also easily be supplied as electrical energy via an electric energy supply 48. Additional heat energy can also be provided by supplying additional fuel to the tuyere 23 as indicated by the supply line 25 in FIG. 1. The tuyere 23 is thus preferably configured to allow control of the combustion, in particular concerning combustion completeness and/or throughput, as well as control of supplied amount of heat to the smelter shaft 2.

The entire smelter shaft, i.e. the melting reactor 2, and the reducer shaft, i.e. the smelting reduction reactor 3, are preferably refractory lined. Preferably, in a conical expansion zone of the smelter shaft and in a conical part of the shafts have a relatively thin lining, typically 4-12 cm, with strong water-cooling of the shell. In these parts, the refractory thickness will be at equilibrium between dissolving of refractory and solidification of a slag layer on the wall.

Seen as a whole, reductants are supplied to the furnace equipment. The reductants are used for two purposes. The first one is the reduction of iron oxides to iron. The second one is to provide the system with energy sufficient to melt the raw material and to support the reduction process. According to the present invention, these purposes are physically divided between a melting reactor and a smelting reduction reactor. The main object in the smelting reduction reactor is to provide the correct reduction potential, and the heating purpose is of minor concern. In the melting reactor on the other hand, melting of the raw material is the main task, while pre-reduction (or oxidation) is of minor concern. The two processes are, however, closely linked to each other, e.g. in terms of the temperature and oxidation level of the slag being transferred between the shafts and the amount and content of the reduction gas mixture.

If the transferred slag has a high level of oxidation, the amount of reductants to be added in the smelting reduction reactor has to be increased. A result is that the amount of produced reduction gas mixture also increases. Such amount of reduction gas mixture may even be larger than the amount needed for melting the raw material in the melting reactor.

For each composition of raw material, there is thus an optimum choice of temperature and oxidation level of the slag transferred between the two shafts, which leads to a full utilization of the chemical energy in the reduction gas mixture. This optimum choice will also be influenced by e.g. the amounts and types of slag formers added to the system.

In many of the tests of different compositions of raw material, it has been found that a partial reduction of iron-containing raw material into FeO is often situated relatively close to the absolute optimum conditions. It is therefore in many cases preferable to have the iron oxide containing liquid slag 6 comprising mainly FeO, i.e. wüstite.

In a particular embodiment, the melting reactor 2 further comprises an injector 26 of an oxygen-containing gas. The injector 26 is arranged above a surface 45 of the iron-oxide containing liquid slag and the oxygen-containing gas is intended for combustion of gas escaping from the surface 45 of the iron oxide containing liquid slag 6 that is not fully combusted. In a typical case the ratio $CO_2/(CO+CO_2)$ may be in the order of 0.8. This remaining CO was thus not fully oxidized in the combuster 28 or in the interaction with the iron oxide containing liquid slag 6. The gas 16 leaves the melting reactor 2 through a gas exit 14. A gas cleaner 15 is preferably provided in order to remove e.g. volatile metal vapors and particles from the main gas components.

The purified gas 17 leaving the system comprises essentially only $H_2O$ and $CO_2$.

Any sulphur content of the iron-containing raw material 4 will typically be removed in the melting reactor 2, either into the reactor gases or as part of a matte phase. These sulphur-containing gases will be taken care of in the gas cleaner 15. The final sulphur content in the produced iron will be more or less independent on the original content in the feed of raw material.

To some extent sulphur being present in the smelting reduction reactor goes into the hot metal and will end up in the produced iron metal. The sulphur content in the final product will therefore be dependent on the sulphur content of the reductant used in the smelting reduction reactor.

Copper, typically in form of different copper oxides, may also be present in the raw material, e.g. if EAF dusts are used. In the melting reactor, the copper will typically be removed as metallic and/or matte copper (Cu/CuS) in the bottom of the melting reactor. This is due to the oxygen potential in the melting reactor. The ratio $CO_2/(CO+CO_2)$ is typically in the order of 0.8, and this favors metallic copper formation from copper oxides and/or copper matte formation if sulphur is present. Superior stirring conditions in the reactor, in particular when plasma generators are used, enhances coalescence of copper inclusions into clusters, which settles down into the bottom of the reactor more easily. The liquid metallic copper and/or liquid copper matte can then easily be removed from the bottom of the reactor. A result of this is that iron oxide materials with a relatively high Cu content, such as e.g. EAF dust, may be charged into the process with little influence on the Cu content in the final hot metal.

Figure 2:
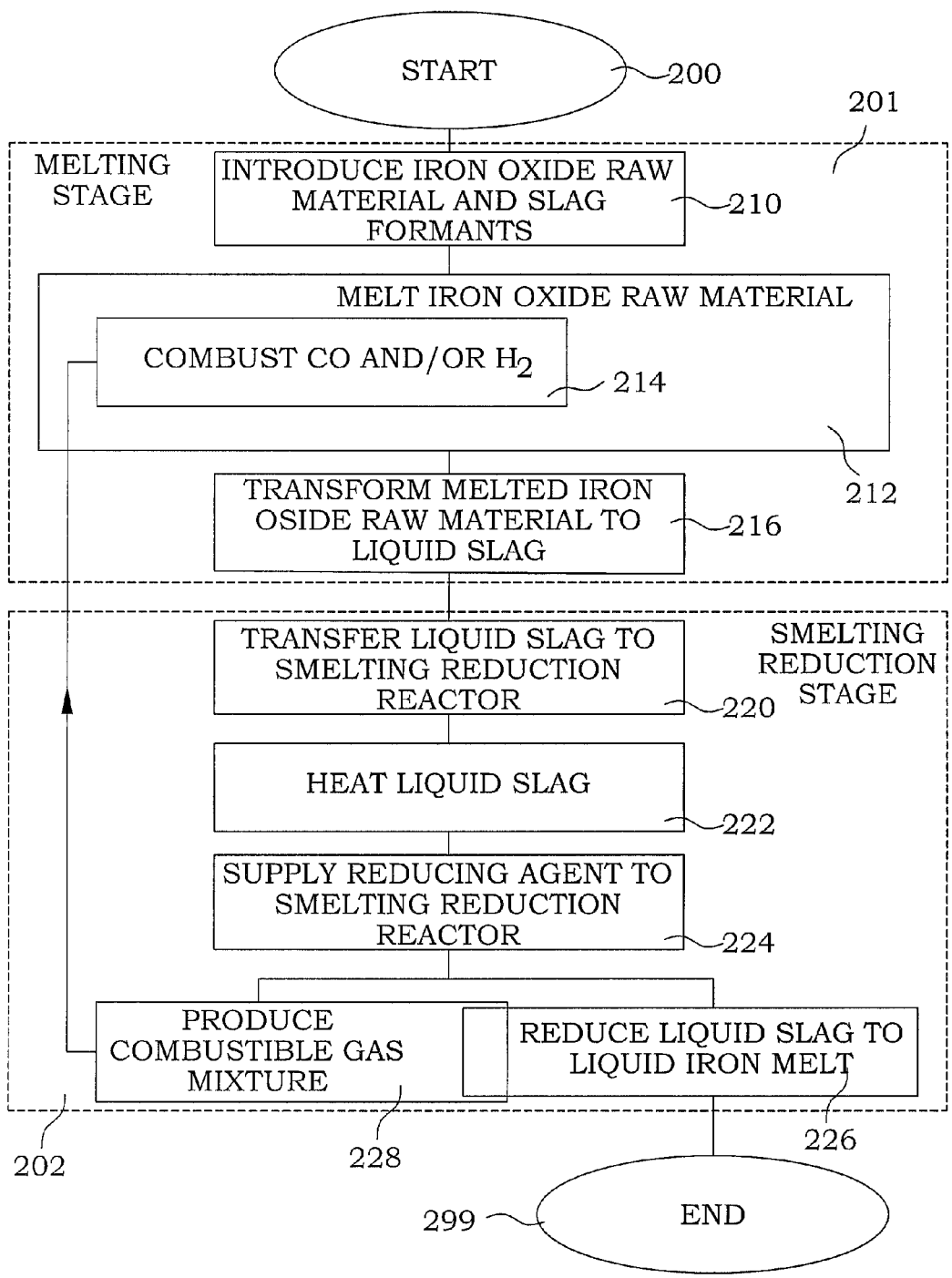
FIG. 2 is a flow diagram of steps of an embodiment of a method according to the present invention.

FIG. 2 illustrates a flow diagram of steps of an embodiment of a method according to the present invention. The method for manufacturing of iron starts in step 200. A melting stage is generally denoted as 201. In the melting stage, in step 210, an iron oxide-containing raw material and slag formers are added to a melting reactor. In step 212, the iron oxide-containing raw material is melted. The melted iron oxide-containing raw material together with the slag former is in step 216 transformed into an iron oxide-containing liquid slag. A smelting reduction stage is generally denoted as 202. In the slag smelting reduction stage, in step 220, the iron oxide containing liquid slag is transferred into a smelting reduction reactor. In step 222, the iron oxide containing liquid slag is heated in the smelting reduction reactor. A reducing agent is supplied to the smelting reduction reactor in step 224. The iron oxide-containing liquid slag is in step 226 reduced into a liquid iron melt. In step 228, a combustible gas mixture comprising at least one of CO and $H_2$ is produced. This production 228 occurs simultaneous to and in dependence on the reduction step 226. The step 212 of melting in turn comprises a step 214 of combusting at least a part of CO and/or $H_2$ from the combustible gas mixture in or in connection with the melting reactor, for utilizing generated combustion heat for the melting. The procedure ends in step 299.

In one preferred embodiment, the step of melting 212 comprises operating of a first plasma generator, in connection to which the combustion 214 takes place, to produce a first hot gas jet and introducing said first hot gas jet into said melting reactor at a level below a surface of said melted iron oxide-containing raw material.

In another preferred embodiment, the combustion 214 takes place by injection of an oxygen containing gas and the combustible gas mixture part into a tuyere at a level below a surface of the melted iron oxide-containing raw material.

The dividing of the process into two stages makes it possible to utilize the reductant or reducing agent completely in the process in an efficient manner. Since the reductant is injected directly into the smelting reduction reactor as particles, fluid or gas it can be chosen in a wide range from pure hydrogen over gaseous and liquid hydrocarbons to coal and coke fines. This makes it possible to choose reductant entirely from cost and availability point of view. Due to the high thermal efficiency and possibility to choose reductant, the $CO_2$ emission can be brought to very low figures compared to existing processes. Compared to a conventional blast furnace process, the estimated $CO_2$ emission of the present invention is 45-70% when operating with coke as reductant, 40-60% when operating with coal as reductant, 30-40% when operating with LPG as reductant, 25-35% when operating with natural gas as reductant and 0% when operating with hydrogen gas as reductant. The span in the $CO_2$ emissions comes from the carbon/hydrogen ratio in the used reductant.

The use of plasma generators is preferred, both in the melting reactor and in the smelting reduction reactor. Because of the high energy density in the plasma jet, the produced gas volumes are strongly reduced compared to other alternative methods. This increases the thermal efficiency of the entire process.

By having the possibility to inject the iron-containing raw material directly into the melting reactor where it is melted, the process becomes more or less independent on the physical properties, such as softening or sticking, of the material feed during the heating and pre-reduction.

The invention will be further described in connection to a pilot plant test of the process. The test was carried out in a furnace equipment, schematically shown in FIG. 1, consisting of two rectors (one melting and one smelting reduction reactor) equipped with a plasma generator—tuyere assembly each. In both assemblies the plasma generator is supplied with plasma gas, electricity and cooling water while the tuyeres are supplied with air/oxygen, fuel gas (in this case recycled process gas from the smelting reduction reactor), and solid reductant (coal). The tuyere of the assembly enters into the reactors below the respective slag level so the hot gases from the assembly bubbles through the slag bath creating an efficient mass and heat transfer. The melting is further equipped with means to feed the iron oxide bearing raw materials plus slag formers from the top, lances to inject combustion air in the upper part of the reactor and an gas off take. The smelting reduction reactor is equipped with means to feed solid materials (reductant and/or slag formers) from the top and a gas off take. The top and bottom part of the reactor are refractory lined while the middle part (from the tuyeres and upwards through the conical part) is a water cooled section where a freeze-lining is created. The two reactors are connected via a slag launder to feed molten slag from the melting reactor into the smelting reduction reactor. The slag launder is equipped with a dam and slag lock to prevent the gases from one reactor to be mixed with the gases from the other. The off-gas from the melting reactor is completely combusted and will after cleaning go to a stack while the off-gas from the smelting reduction reactor (consisting mainly of CO and $H_2$) is cleaned and compressed and used as plasma gas in both reactors, any excess gas will be used as fuel gas and injected via the tuyere into the melting reactor.

The process is started by creating a slag bath in both reactors by melting slag formers and iron oxide. In the melting reactor a mixture of iron ore and lime is melted by operating the plasma generator on air and electricity while LPG is injected into the tuyere. The air/LPG ratio is controlled to give a $CO_2/CO+CO_2$ ratio of 0.7. The CO remaining in the gas leaving the slag bath is then completely combusted by air injection by lances in the upper part of the reactor. During melting the raw materials with the slightly reducing gas from the plasma generator assembly the $Fe_2O_3$ will form FeO in the liquid slag. The mixture of raw materials are controlled in such a way as the FeO content of the liquid slag will be in the order of 70-98% while the basicity ($CaO/SiO_2$) is kept to 1.1-1.3. In this way the melting reactor is filled with molten FeO-slag up to the level of slag launder to the smelting reduction reactor.

In the smelting reduction reactor another raw material mixture is fed and melted in a similar way but the mixture is controlled to give a molten slag with 5-10% FeO and a basicity of 1.1-1.3. The smelting reduction reactor is in this way filled with molten slag up to the level of the slag tapping spout.

After having prepared the process equipment this way the process is ready to start iron metal production. The production of metal starts immediately when coal/coke is fed to the smelting reduction reactor. In the beginning some extra coal is fed to ensure a certain excess of carbon. This excess carbon is controlled to give a suitable carburization of the produced iron and thereby also control its melting temperature. As soon as the metal production starts the feeding of iron oxide bearing material and slag formers to the melting reactor also starts and the tap hole to the slag launder is opened allowing FeO-rich slag to flow from the melting reactor into the smelting reduction reactor. The flow rate of this FeO-rich slag is controlled by the feed rate of raw materials to the melting reactor.

When the production of iron metal starts the smelting reduction reactor starts to produce a CO and $H_2$ rich off-gas. This off-gas is cleaned, compressed and utilized partly as plasma gas in both reactors while the LPG used in the tuyeres are phased out. The CO and $H_2$ rich off-gas not used as plasma gas is injected with oxygen into the tuyere in the melting reactor.

The metal production has now entered into a steady state. During operation the production rate is controlled by the raw materials feeding rate and the temperatures are kept constant. Since both reactors are water cooled by a twin shell system the lining consist mainly of a frozen slag layer (freeze lining) and the heat losses to the cooling water is directly dependent of the slag temperatures (i.e. the superheating of the slag above its melting point). In this way the slag temperature is indirectly measured by the heat losses and controlled by the power input from the plasma generators. During operation the high FeO-slag which is melted in the first reactor is continuously flowing from the first reactor into the second (smelting-reduction) reactor through a sealed slag launder equipped with a slag dam to prevent the gases from the two reactors to mix. During steady state operation in the test plant, the feed of oxides to the first reactor was about 400 kg/hour and the feed of petro coke to the smelting reduction reactor was about 60 kg/hour. The power levels of the plasma generators were 300 kW in the first reactor and 700 kW in the smelting reduction reactor. The smelting reduction reactor was tapped once per hour and gave about 250 kg of hot metal and 30 kg of slag.

Compensated for the high specific heat losses in the small pilot plant reactor these tests indicate the following consumption figures per ton of produced hot metal.

| | |
|---|---|
| Iron oxide ($Fe_2O_3$) | 1430 kg |
| Petro coke | 230 kg |
| Oxygen | 180 $m^3n$ |
| Electricity | 1050 kWh |

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A method for manufacturing of iron, having:
    a melting stage, comprising:
        introducing an iron oxide-containing raw material and slag formers to a melting reactor;
        melting said iron oxide-containing raw material in said melting reactor; and
        transforming said melted iron oxide-containing raw material into a liquid slag; and
    a smelting reduction stage, comprising:
        transferring said liquid slag into a smelting reduction reactor;
        heating said liquid slag in said smelting reduction reactor;
        supplying a reducing agent to said smelting reduction reactor;
        reducing said liquid slag in said smelting reduction reactor into a liquid iron melt; and
        producing a combustible gas mixture in said smelting reduction reactor comprising at least one of CO and $H_2$;
    said melting in turn comprising combustion of at least a part of at least one of CO and $H_2$ in said combustible gas mixture in or in connection with said melting reactor, for utilizing generated combustion heat for said melting.

2. The method according to claim 1, wherein said step of melting comprises operating of a first plasma generator, in connection to which said combustion takes place, to produce a first hot gas jet and introducing said first hot gas jet into said melting reactor at a level below a surface of said melted iron oxide-containing raw material.

3. The method according to claim 2, wherein said combustion takes place by injection of an oxygen containing gas and a part of said combustible gas mixture into a tuyere at a level below a surface of said melted iron oxide-containing raw material.

4. The method according to claim 2, wherein said heating and supplying are preformed jointly by operating of a second plasma generator to produce a second hot gas jet, and by introducing said second hot gas jet into said smelting reduction reactor at a level below a surface of said liquid slag in said smelting reduction reactor.

5. The method according to claim 1 wherein said combustion takes place by injection of an oxygen containing gas and a part of said combustible gas mixture into a tuyere at a level below a surface of said melted iron oxide-containing raw material.

6. The method according to claim 5, wherein said heating and supplying are preformed jointly by operating of a second plasma generator to produce a second hot gas jet, and by introducing said second hot gas jet into said smelting reduction reactor at a level below a surface of said liquid slag in said smelting reduction reactor.

7. The method according to claim 1, wherein said heating and supplying are preformed jointly by operating of a second plasma generator to produce a second hot gas jet, and by introducing said second hot gas jet into said smelting reduction reactor at a level below a surface of said liquid slag in said smelting reduction reactor.

8. The method according to claim 1, wherein said transforming comprises partial reduction of iron oxides of said iron oxide-containing raw material into mainly FeO.

9. The method according to claim 1, wherein said reducing agent is selected as at least one of: charcoal, coal, hydrogen, gaseous hydrocarbons, liquid hydrocarbons and coke.

10. The method according to claim 1, wherein said slag formers comprises at least one of limestone, dolomite and quartz in an amount giving said liquid slag a melting point within 50-150° C. above a melting point of said liquid iron melt.

11. The method according to claim 1, wherein said melting stage further comprises injecting an oxygen-containing gas in said melting reactor above a surface of said liquid slag for combustion of gas escaping said surface of said liquid slag.

12. The method according to claim 1, wherein said melting stage further comprises reduction of CuO into at least one of metallic Cu and matte CuS and separation of said at least one of metallic Cu and matte CuS from said liquid slag.

13. A furnace equipment for manufacturing of iron, having:
- a melting reactor, comprising:
  - a melter arrangement configured to melt said-iron oxide-containing raw material in said melting reactor and transforming said melted iron oxide-containing raw material into a liquid slag; and
- a smelting reduction reactor, connected by a slag transfer arrangement to said melting reactor;
- said smelting reduction reactor comprising:
  - a heater arrangement configured to heat liquid slag in said smelting reduction reactor;
  - a port supplying a reducing agent into said smelting reduction reactor for reducing said liquid slag into a liquid iron melt and for producing a combustible gas mixture comprising at least one of CO and $H_2$; and
- a gas connection connected between an upper part of said smelting reduction reactor and said melter arrangement in said melting reactor for supplying said combustible gas mixture to said melter arrangement;
- said melter arrangement in turn comprising a combuster configured to combust at least a part of at least one of CO and $H_2$ in said combustible gas mixture in or in connection with said melting reactor, said combuster being configured for allowing utilizing generated combustion heat for said melting.

14. The furnace equipment according to claim 13, wherein said melter arrangement comprises a combination of a first plasma generator and a first tuyere in which said combustion takes place, configured to produce a first hot gas jet; said melter arrangement being further configured for introducing said first hot gas jet into said melting reactor at a level below a surface of said melted iron oxide-containing raw material.

15. The furnace equipment according to claim 13, wherein
said heater arrangement and said port supplying a reducing agent jointly are constituted by combination of a second plasma generator and a second tuyere into which said reducing agent is provided, configured to produce a second hot gas jet; said heater arrangement being further configured to introduce said second hot gas jet into said smelting reduction reactor at a level below a surface of liquid slag covering said liquid iron melt.

16. The furnace equipment according to claim 15, wherein
said second plasma generator is configured to allow at least one of:
control of feed rate of reducing agent; and
control of supplied amount of heat to said smelting reduction reactor.

17. The furnace equipment according to claim 13, wherein port supplying a reducing agent is configured to supply a reducing agent selected as at least one of: charcoal, coal, hydrogen, gaseous hydrocarbons, liquid hydrocarbons and coke.

18. The furnace equipment according to claim 13, wherein the smelting reduction reactor is configured to supply solid reducing agent through feed ports in the upper part of said reactor.

19. The furnace equipment according to claim 13, wherein said melting reactor further comprises an injector of an oxygen-containing gas arranged above a surface of said liquid slag for combustion of gas escaping said surface of said liquid slag.

20. The furnace equipment according to claim 13, wherein said slag transfer arrangement comprises a slag transfer launder including a slag lock configured to prevent any mixing between the atmospheres in the melting reactor and smelting reduction reactor, respectively.

21. The furnace equipment of claim 13 wherein said melting reactor includes means for introducing an iron oxide-containing raw material and slag formers to said melting reactor.

22. The furnace equipment of claim 21 wherein said means for introducing includes an inlet supplied by a first transporter providing the iron oxide containing raw material and a second transporter supplying slag formers.

* * * * *

UNITED STATES PATENT AND TRADEMARK OFFICE
CERTIFICATE OF CORRECTION

PATENT NO.        : 9,499,872 B2
APPLICATION NO.   : 14/383471
DATED             : November 22, 2016
INVENTOR(S)       : Sven Santén et al.

It is certified that error appears in the above-identified patent and that said Letters Patent is hereby corrected as shown below:

In the Claims

In Claim 2, at Column 12, Line 27, change "wherein said step of melting" to --wherein said melting--.

Signed and Sealed this
Twenty-eighth Day of March, 2017

Michelle K. Lee
*Director of the United States Patent and Trademark Office*